March 10, 1959 G. J. OHLHAVER 2,876,674
OPAQUE PICTURE VIEWER WITH ANGLED LENS
Filed Feb. 18, 1957 2 Sheets-Sheet 1
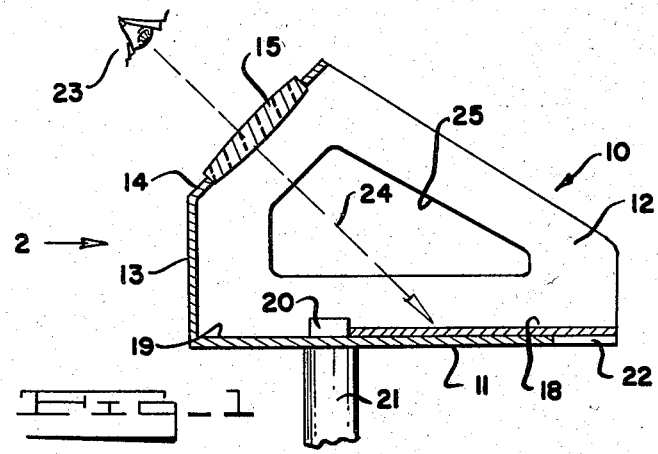
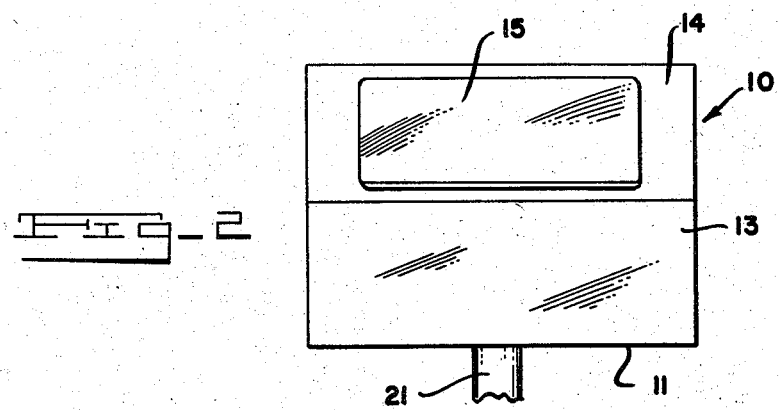
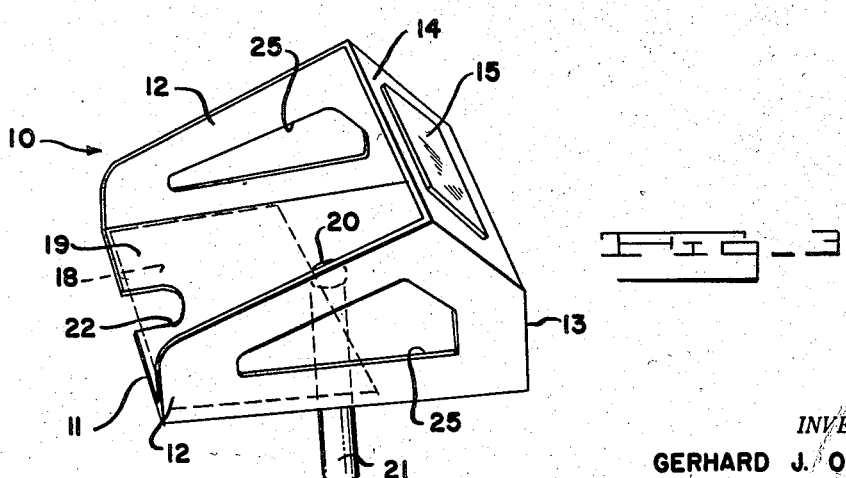
INVENTOR.
GERHARD J. OHLHAVER
BY
ATTORNEYS March 10, 1959 G. J. OHLHAVER 2,876,674
OPAQUE PICTURE VIEWER WITH ANGLED LENS
Filed Feb. 18, 1957 2 Sheets-Sheet 2
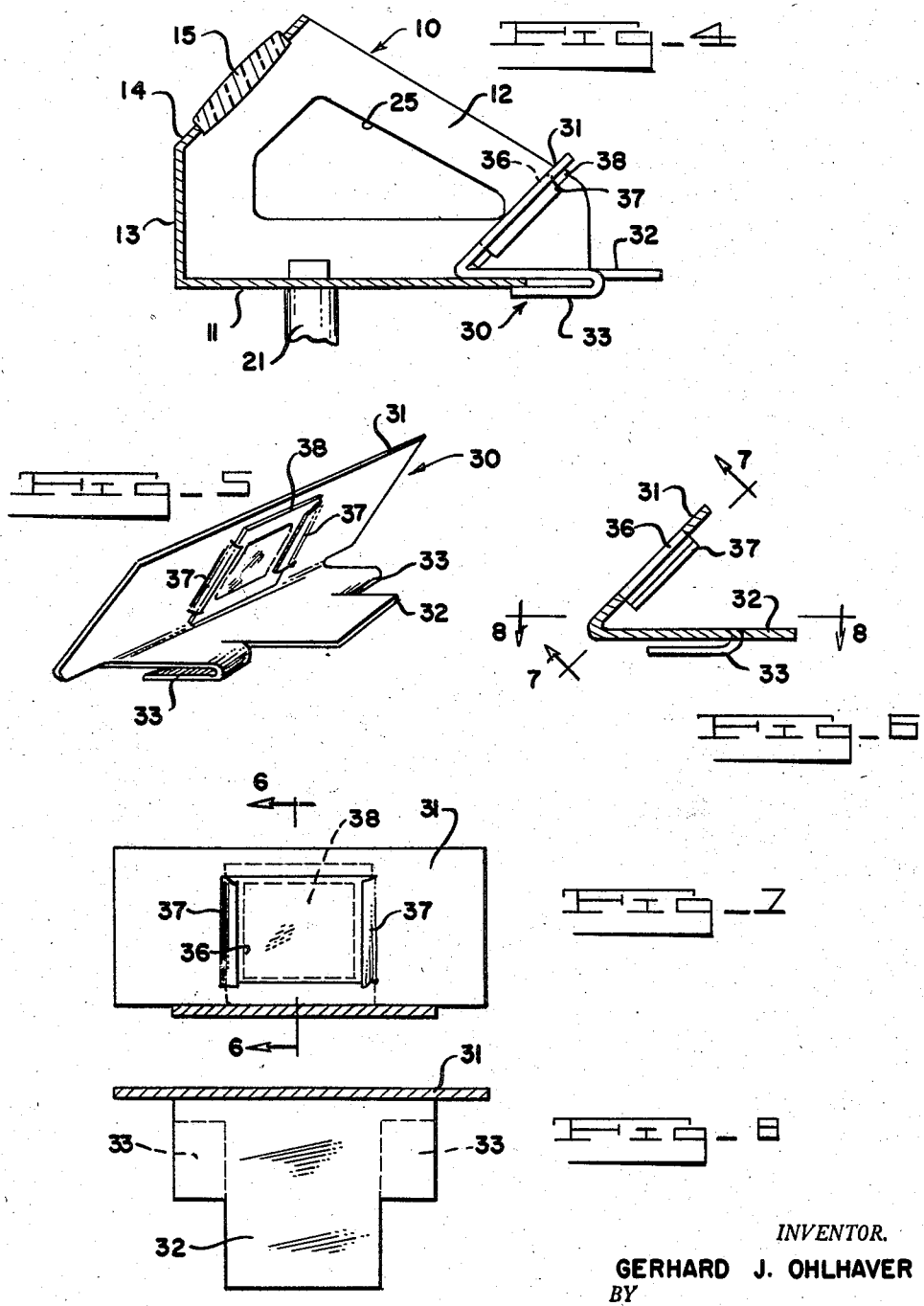
INVENTOR.
GERHARD J. OHLHAVER
BY
ATTORNEYS

2,876,674

OPAQUE PICTURE VIEWER WITH ANGLED LENS

Gerhard J. Ohlhaver, St. Clair Shores, Mich.

Application February 18, 1957, Serial No. 640,953

1 Claim. (Cl. 88—29)

This invention relates to a viewer useful for viewing pictures in relief illusion and also convertible for use in viewing film transparencies.

An object of this invention is to provide a viewer formed to enable a person to view a two dimensional picture in enlarged relief illusion.

Another object of this invention is to provide a viewer formed to view opaque pictures in enlarged relief illusion and having an attachment for supporting and positioning a film slide transparency so that the same viewer may be easily converted for viewing film slide transparencies.

These and other objects of my invention will become apparent upon reading the following description of which the attached drawings form a part.

With reference to the drawings, in which:

Fig. 1 is a cross-sectional side view of the viewer.

Fig. 2 is a front elevation taken in the direction of arrow 2 on Fig. 1.

Fig. 3 shows the viewer in perspective.

Fig. 4 is a view similar to Fig. 1 but showing the film slide transparency attachment in position on the viewer.

Fig. 5 shows the rear of the attachment in perspective.

Fig. 6 is a cross-sectional view of the attachment taken in the direction of arrows 6—6 of Fig. 7, and Figs. 7 and 8 are views taken in the direction of arrows 7—7 and 8—8 respectively on Fig. 6.

*The viewer construction*

The viewer is constructed of a box-like frame 10 having a bottom 11, side walls 12, and a front wall 13, and open at the top and rear end. The front wall 13 is bent at its top part into an angle of approximately 40–50°, 45° being the preferred angle, relative to the bottom 11. A lens 15 in the form of a magnifying glass is mounted in a window opening cut into the front wall top portion 14 and likewise is at approximately 40–50° to the plane of the bottom 11.

In operation, a picture, which may be any opaque printed picture such as a part of a newspaper, a post card, an ordinary photograph, etc., in color or in black and white, 18, is placed upon the top surface 19 of the bottom 11. A stop 20 regulates and positions the picture 18 in cooperation with the side walls 12. The stop 20 may be a fastener extending through the bottom 11 and connected to a handle 21 by which the viewer may be easily picked up and manipulated.

For ease of insertion of the picture upon the surface 19 and also for removal of the picture, a finger hole 22 is formed in the bottom 11, as shown in Figs. 1 and 3.

The viewer positions his eyes 23 at a short distance before the lens 15, a distance which may vary between a few inches and a foot or so and then looks through the lens 15 in the direction of the arrow 24 to see the picture 18 not only enlarged but in relief illusion.

In order to properly illuminate the picture 18, it may be desirable to cut openings 25 in the side walls 12 to give greater illumination and it may likewise be desired to place electric bulbs within the frame like box in the corners formed at the junction between the front wall top portion 14 and the side walls 12. These lights (not illustrated) are useful here for increasing the amount of light available upon the picture to be reflected back through the lens 15, particularly where the viewing device is used in a room which is not well lit.

*The film transparency attachment*

Where it is desired to use this viewer to view film slide transparencies of the conventional type, it is necessary to provide some means for passing light through the transparency. The viewer described above is arranged for use with opaque type pictures and arranged to show these opaque type pictures in three dimensions. Thus, in order to accommodate the viewer for use with film slide transparencies, an attachment 30 is provided. This attachment 30 is illustrated in Figs. 4 to 8 inclusive.

Referring to Fig. 5, the attachment 30 is formed of a single sheet of metal or the like bent to form an easel part 31 and a base part 32 arranged at an acute angle relative to each other. The sides of the base part are strick out to form springy clips 33. These clips 33 engage with the bottom 11 of the viewer to clip the base 32 on top of the bottom 11 of the viewer and thereby position the easel 31 at a distance from but aligned with the lens 15 of the viewer. To obtain proper alignment, it is preferred that the easel part be wide enough to approximately fill the space between the viewer side walls 12.

A window 36 is formed in the easel part 31 and the sides forming the window 36 are struck out at 37 to form slides or brackets to engage with and hold a film slide transparency as illustrated for example in Fig. 7.

The top surface of the base 32 is formed as a light reflective surface, such as by painting the top with a suitable light reflective paint or by otherwise buffing or shining the top so as to reflect light through the window 36, through the film slide transparency 38 and through the lens 15 of the viewer.

With this construction, once the attachment is mounted on the viewer, the slides may be readily inserted into and pulled out from between the brackets 37. However, with this attachment, the slides are not seen in relief illusion as is the case with the opaque type of picture using the viewer by itself, but rather the slides are seen as they appear in two dimensions in the picture itself.

This invention may be further developed within the scope of the following attached claim. Accordingly, it is desired that the foregoing description be read as being merely illustrative of an operative embodiment of my invention and not in a strictly limiting sense.

I now claim:

A viewer for viewing opaque type pictures in relief illusion, comprising a thin, flat, substantially horizontal base sheet upon which a substantially opaque type picture may be placed with its back face in contact with the top face of the base and with the picture facing upwards; one end of the sheet being bent upwards from the sheet to form a front wall rigidly secured to said base and permanently arranged at approximately 45° to the base; a window opening formed in the front wall and a magnifying glass lens permanently mounted within said window opening and being substantially coplanar with the wall; the wall and opening being so positioned that the axis of the lens, that is, a line drawn normal to the lens through its center, will strike a picture placed upon the base at approximately the center of the picture, said wall and lens being unobstructed so that said lens axis is the line of sight for viewing a picture through the viewer, a pair of side walls connecting the side edges of the base with the side edges of the front wall, the side walls being apertured for admitting light upon the base, a stop formed on the top face of the base at a point remote from the rear edge of the base and defining with the side walls a picture locating means whereby a person in front of the lens, looking along the lens axis through the lens thereby sees an ordinary two dimensional picture which is placed upon the base in enlarged relief illusion.

References Cited in the file of this patent

UNITED STATES PATENTS

| | | |
|---|---|---|
| 2,345,416 | Naramore | Mar. 28, 1944 |
| 2,419,339 | Dennis | Apr. 22, 1947 |
| 2,654,173 | Christensen et al. | Oct. 6, 1953 |
| 2,785,485 | Cameron | Mar. 19, 1957 |

FOREIGN PATENTS

| | | |
|---|---|---|
| 343,319 | France | Aug. 2, 1904 |
| 1,076,707 | France | Apr. 21, 1954 |
| 1,098,179 | France | Mar. 2, 1955 |